UNITED STATES PATENT OFFICE.

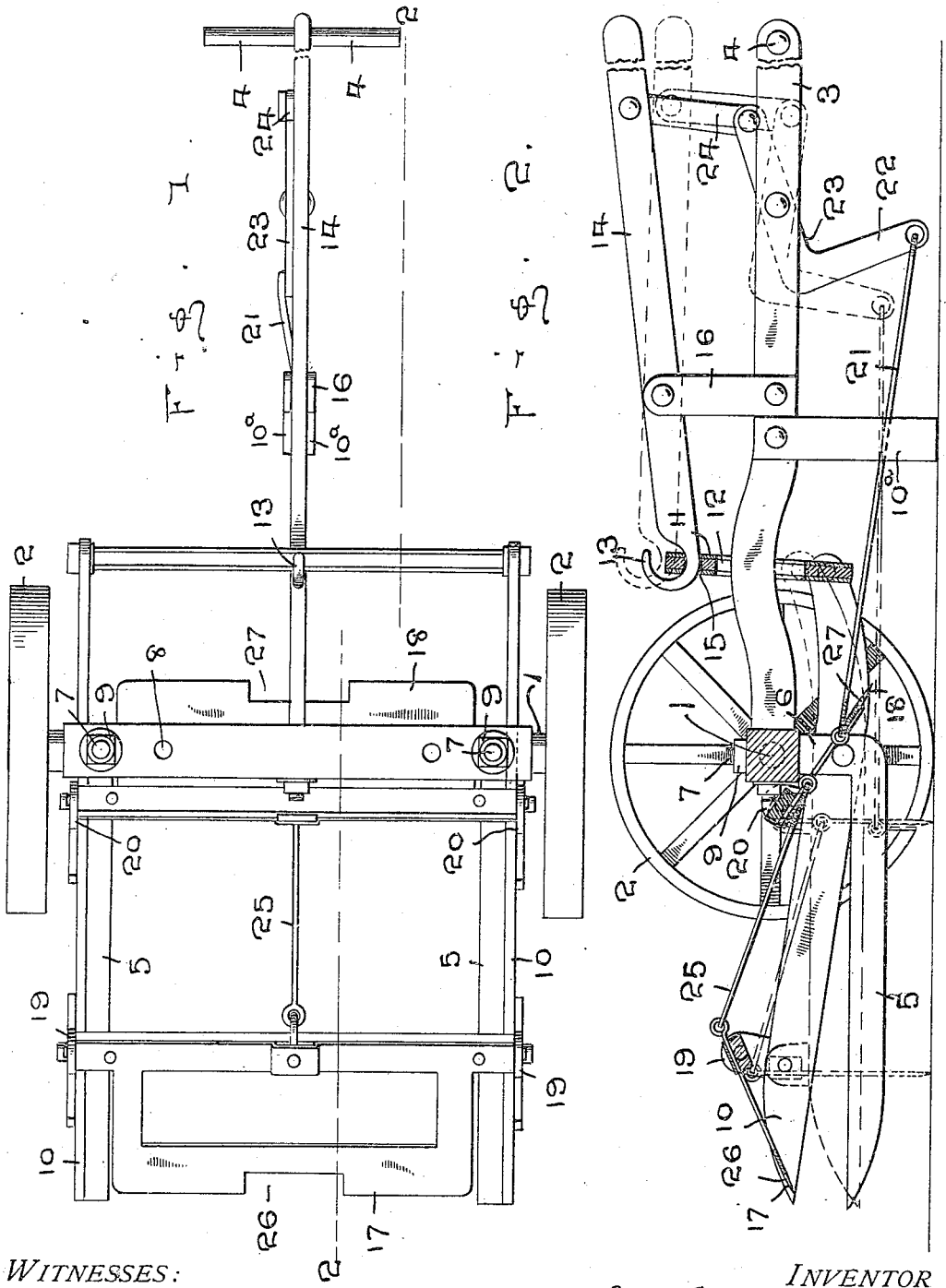

CARL H. MEYER, OF WASHINGTON, PENNSYLVANIA.

PRUNING DEVICE.

952,750.

Specification of Letters Patent. Patented Mar. 22, 1910.

Application filed April 20, 1909. Serial No. 491,089.

*To all whom it may concern:*

Be it known that I, CARL H. MEYER, a citizen of the United States, residing at Washington, in the county of Washington and State of Pennsylvania, have invented certain new and useful Improvements in Pruning Devices; and I do hereby declare the following to be a full, clear, and exact description of the invention, such as will enable others skilled in the art to which it appertains to make and use the same.

My invention relates to new and useful improvements in pruning devices and more particularly to that class adapted to be employed for clipping or trimming the runners of vines which grow upon the ground and my object is to provide a device of this class which may be propelled along the row of growing plants and the runners or shoots from said plants, severed or clipped.

A further object is to provide chopping means for the shoots or runners extending lengthwise of the row.

A further object is to provide means for increasing or decreasing the distance between the side clippers, and a still further object is to provide means for operating the parts of the pruning device simultaneously.

Other objects and advantages will be hereinafter referred to and more particularly pointed out in the claims.

In the accompanying drawings forming part of this application, Figure 1 is a top plan view of my improved pruning device, and, Fig. 2 is a sectional view thereof as seen on line 2—2, Fig. 1, the position of the parts of the pruning device being shown in their open position in full lines and in their operative position by dotted lines.

Referring to the drawings in which similar reference numerals designate corresponding parts throughout the several views, 1 indicates an axle upon which are mounted any suitable form of supporting wheels 2 and secured to said axle is a guiding and propelling tongue 3 having at its outer end a cross arm 4 whereby the tongue may be readily operated.

Attached to the axle 1 and extending forwardly thereof are runner lifters 5, the forward ends of which are curved so that when they are brought into engagement with the earth's surface, they will easily slide over the surface and at the same time engage and elevate the shoots or runners of the vines and lift them from the ground, while the opposite ends of said runner lifters are provided with standards 6, which terminate in bolts 7, said bolts being extended through openings 8 in the axle 1 and secured therein by introducing nuts 9 on the upper ends of the bolts.

When the tongue 3 is resting in a horizontal position as shown in Fig. 2, the runner lifters 5 are also extended in a substantially horizontal position and out of engagement with the earth's surface and when not in use, the parts of the device are supported in this position by providing a rest bar $10^a$, which is properly located on the tongue 3.

Pivotally attached to each of the runner lifters 5, is a cutting blade 10, said blade being pivoted to the standard 6 adjacent the point of intersection between the standard and runner lifters and by properly adjusting the blade on the runner lifter, an object introduced between the blade and lifter will be severed, when the cutting blade is lowered, said blade having a scissors action.

The rear ends of the blades 10 are extended beyond their pivotal points and are pivotally engaged with an operating bar 11, which bar is provided with a slot 12, through which the tongue 3 extends, the slot being of sufficient length to permit the bar 11 to move upwardly and downwardly to raise and lower the cutting portion of the blades 10.

The operating bar 11 is substantially plate-like and is engaged at its upper end with a hook 13 of an operating lever 14, the hook 13 extending through an opening 15 in the plate and substantially at its longitudinal center, the lever 14 being pivotally mounted in its length between standards 16 carried by the tongue 3 and as the end of the lever terminates substantially co-incident to the length of the tongue 3, the end of said lever will be brought into position to be readily engaged and operated by the person propelling the pruning device.

When the device is in operation, the free end of the tongue 3 is elevated, thereby disposing the curved portion of the runner lifters 5 into engagement with the soil and in position to pass under the runners growing thereover and after the device has been propelled forwardly a sufficient distance to dispose the runners the full length of the runner lifters, the lever 14 is operated and the cutting blades 10 moved into engagement with the runner lifters 5, thereby severing the runners disposed over the face of the runner lifters.

As the runners usually grow lengthwise of the rows, as well as to the sides thereof, I also provide means in conjunction with the cutting blades for severing the runners growing lengthwise of the rows, which consist of chopping blades 17 and 18, said chopping blades being pivotally mounted between ears 19 and 20, respectively, attached to the blades 10, the ears 19 being adjacent the outer ends of the blade, while the ears 20 are positioned adjacent the pivotal point of said blades and in order to operate the chopping blades co-incident to the operation of the cutting blades, the chopping blade 18 is connected to the operating lever 14 through the medium of a pitman 21, one end of which is attached to the blade 18, while the opposite end thereof is attached to the depending arm 22 of a bell crank lever 23, said bell crank lever being pivotally mounted on the tongue 3 and having connection with the operating lever 14, through the medium of a link 24 and as best shown in Fig. 2 it will be readily seen that when the operating lever 14 is depressed to lower the cutting blades 10, the chopping blade 18 will be brought to a vertical position and the cutting edge thereof forced into engagement with the runners in the row, when the cutting blades 10 are lowered.

The chopping blade 17 is simultaneously operated to dispose the same in a vertical position by extending a thrust bar 25 between the blades 17 and 18 and as the end of the thrust bar is attached to the chopping blade 18 below its pivot and its opposite end to the chopping blade 17 above its pivot, the blades 17 and 18 will be swung away from each other, when the cutting blades 10 are elevated and a thrust being given the blade 18 to lower the same, will likewise lower the blade 17. The central portions of the blades 17 and 18 are provided with recesses 26 and 27, respectively, whereby the runners immediately in the row will not be chopped, this provision being occasioned in case the vines be scattering, thereby permitting the vines to grow uninterruptedly.

In operation, the pruning device is tilted until the runner lifters engage the surface of the earth and is then pushed forwardly the proper distance and the operating lever 14 depressed, thereby moving the cutting blades 10 into engagement with the runners or shoots engaged by the runner lifters and at the same time lowering the chopping blades and forcing them into engagement with the runners transversely of the row and to guard against injury to the cutting blades by coming into contact with small pebbles or other obstructions and to prevent the chopping blades from being forced into the earth's surface an unnecessary distance, the tongue 3 is to be lowered until the bar 10ᵃ is in engagement with the earth's surface before the lever 14 is depressed, the length of the bar 10ᵃ being so regulated as to accomplish this result. In some instances, it may be desired to trim the runners more closely along the edge of the row and to this end, the axle 1 is provided with additional openings 8, whereby the runner lifters may be moved nearer the center of the axle, it being understood of course that a separate set of chopping blades and a shorter operating bar are to be provided. It will be clearly understood that as soon as the lever 14 has been operated and the parts again restored to their initial position, the pruning device is to be moved forwardly and again operated, which process is continued until all the runners in the row have been treated, but should it be desired to leave any of the runners unclipped, the tongue 3 at this point is to be sufficiently lowered to bring the runner lifters out of engagement with the runners on the ground, when the pruning device may be moved forwardly without operating upon said runners.

What I claim is:

1. In a pruning device, the combination with an axle, supporting wheels therefor and a tongue, said axle having openings therethrough; of runner lifters having standards at one end and bolts on the standards adapted to engage the openings in the axle, the forward ends of said runner lifters being curved, cutting blades pivotally attached to the runner lifters and adapted to coöperate therewith to produce a shearing effect and means to raise and lower said cutting blades to sever objects engaged by said runner lifters.

2. In a pruning device, the combination with an axle, supporting wheels therefor, and a tongue carried by the axle; of runner lifters attached to said axle, the forward ends of which are curved, cutting blades pivotally secured to said runner lifters and adapted to coöperate with the runner lifters and produce a shearing effect, an operating bar connecting said cutting blades and a lever engaging said operating bar adapted to raise and lower the cutting blades when the lever is operated.

3. In a pruning device, the combination with an axle, supporting wheels therefor and a tongue for said axle; of runner lifters attached to the axle, cutting blades pivoted on the runner lifters, chopping blades pivotally mounted on the cutting blades and means to simultaneously operate the cutting blades and chopping blades to sever objects engaged thereby.

4. In a pruning device, the combination with a supporting axle; of runner lifters adjustably attached thereto, cutting blades coöperating with said runner lifters, chopping blades pivotally mounted on the cutting blades, means to raise and lower the cutting blades and additional means to raise and lower the chopping blades co-incident to the operation of the cutting blades.

5. The combination with a supporting axle and a tongue therefor; of runner lifters carried by the axle, cutting blades pivoted to said runner lifters, means to operate the cutting blades and produce a shearing effect, chopping blades pivoted on said cutting blades, a thrust rod connecting said chopping blades and means to coöperate with the cutting blade-actuating mechanism to simultaneously operate the chopping blades.

In testimony whereof I have signed my name to this specification in the presence of two subscribing witnesses.

CARL H. MEYER.

Witnesses:
M. J. FLYNN,
L. W. McGILL.